Patented Sept. 4, 1923.

1,467,107

UNITED STATES PATENT OFFICE.

EDWARD S. FARROW, JR., OF ROCHESTER, NEW YORK, ASSIGNOR TO EASTMAN KODAK COMPANY, OF ROCHESTER, NEW YORK, A CORPORATION OF NEW YORK.

PROCESS OF MAKING ALKALI CELLULOSE.

No Drawing.  Application filed November 4, 1922. Serial No. 599,140.

*To all whom it may concern:*

Be it known that I, EDWARD S. FARROW, Jr., a citizen of the United States of America, residing at Rochester, in the county of Monroe and State of New York, have invented certain new and useful Improvements in Processes of Making Alkali Cellulose, of which the following is a full, clear, and exact specification.

This invention relates to the manufacture of alkali cellulose, especially the kind adapted to the production of cellulose ethers. The principal object of the invention is to provide a process in which the excess of water used in combining the alkali and cellulose can be quickly and economically removed without substantially impairing the cellulose by excessive reaction with the alkali. Other objects will hereinafter appear.

The preparation of alkali cellulose for the manufacture of cellulose ethers has presented several difficult technical problems, the present invention being a solution of one of these. The requirements of the cellulose ether reaction, especially when the etherifying agent is an alkyl halid, call for a thorough and intimate admixture of cellulose, alkali and water in the correct proportions. A simple and desirable way to bring about this combination is to soak the cellulose in a strong aqueous solution of the alkali. But while this brings the ingredients into intimate contact, such a result is obtained only by the use of larger amounts of water than are desirable during the etherification, especially in certain methods where the water present during the reaction is less than the weight of the alkali.

The removal of this excess of water has been found to be unexpectedly difficult. Pressure methods squeeze out too much alkali along with the water, making necessary the additional step of thoroughly mixing in solid alkali. This can be successfully done, but it is desirable to simplify the process and avoid this extra operation. It has been also proposed to treat the excessively moist alkali cellulose in a vacuum drier, or to distill it with benzol. These methods have been found to be too long and expensive from the manufacturing standpoint. If the material be merely heated in the open air to drive off the excess of moisture, it has been found that the alkali reacts upon the cellulose and degrades it so rapidly that when the desired amount of moisture is removed the cellulose is unsuitable for the production of flexible film-forming cellulose ethers. The excessively degraded cellulose yields only brittle ether products.

By studying the rates at which different methods of drying remove the excess of water and then comparing them with the rate of degradation of the cellulose by the alkali at different temperatures, I have discovered that the excess of water can be quickly and cheaply removed from the alkali cellulose without correspondingly accelerating the rate of degradation of the cellulose if a rapid current of hot dry gas or air be passed in contact with the alkali cellulose. In other words, this system of drying accelerates the rate of alkali action far less than it accelerates the drying action. The removal of the excess water can thus be completed before the general mass of the alkali cellulose is impaired.

I will now give one example of my invention to illustrate how the principle of it may be applied. 100 parts of cellulose, say cotton or wood pulp, are soaked for 1 to 3 days in 1800 parts of an aqueous solution of sodium hydroxid, such solution containing 720 parts of the alkali. This soaking causes an extremely uniform distribution of the alkali throughout the cellulose and brings about such a combination that it is referred to as ripening the mixture. At the end of the soaking period the mass is pressed to remove such proportion of the liquid that the remaining mass weighs roughly 600 parts. This pressing is not indispensable but is used to hasten the drying in the preferred form of the invention. The alkali cellulose is then dried down until the total weight is 400 parts, thus leaving approximately 100 parts of water in intimate relation to the alkali and cellulose. This drying may be effected, for example, by distributing the alkali cellulose in thin layers and passing over them in intimate contact therewith dry (far from saturated) air or gas, say for instance 150 cubic feet of air per minute in contact with each 100 grams of material. The temperature and air current conditions may vary, higher temperatures and faster air currents shortening the drying. I have found 130° F. to 200° F. to be a useful range, 160° F. being preferred. A linear air velocity of roughly 300 feet per minute is preferred. The material during the drying is preferably agitated to bring fresh portions of it into contact with the air current, and for this purpose any ordinary apparatus, such as a rotary drum, may be employed, through which the air passes.

The high velocity of the air past the alkali cellulose is an impotant factor in my process, because it tends to decrease and sweep away the film of air saturated with moisture which is forming around the material. The tumbling of the material in the rapid current of drying gas also promotes intimate contact of the air with all parts of the alkali cellulose.

Having thus described my invention, what I claim as new and desire to secure by Letters Patent is:

1. The process of preparing alkali cellulose for etherification, which comprises the steps of mixing cellulosic material and alkali with an excess of water over the amount required for the etherification and accelerating the removal of said excess of water without a proportionate acceleration of the action of the alkali on the cellulose by passing a rapid current of hot dry gas in contact with said mixture.

2. The process of preparing alkali cellulose for etherification, which comprises the steps of mixing cellulose and alkali with an excess of water over the amount required for the etherification and removing the excess of water by passing a rapid current of air heated to from 130° F. to 200° F. to contact with said mixture.

3. The process of preparing alkali cellulose for etherification, which comprises the steps of mixing cellulose and alkali with an excess of water over the amount required for the etherification, ripening the mixture, and removing the excess of water by agitating the mixture in a rapid current of dry air at a temperature between 130° F. and 200° F.

4. The process of preparing alkali cellulose for etherification, which comprises the steps of mixing cellulose with an aqueous solution of alkali containing an excess of alkali and of water over the amounts required for the etherification, mechanically removing said excess of alkali and part of said excess of water and then removing the remainder of said excess of water by passing a rapid current of hot dry gas in contact with the alkali cellulose.

Signed at Rochester, New York, this 31st day of October, 1922.

EDWARD S. FARROW, Jr.